April 23, 1957  O. MITCHELL  2,789,576
HYDRAULIC VALVE FOR CONSTANT SPEED CONTROL
Filed Aug. 22, 1955
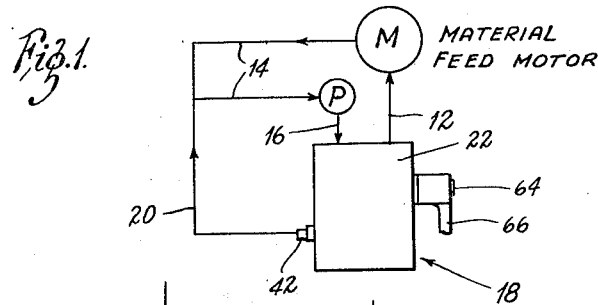
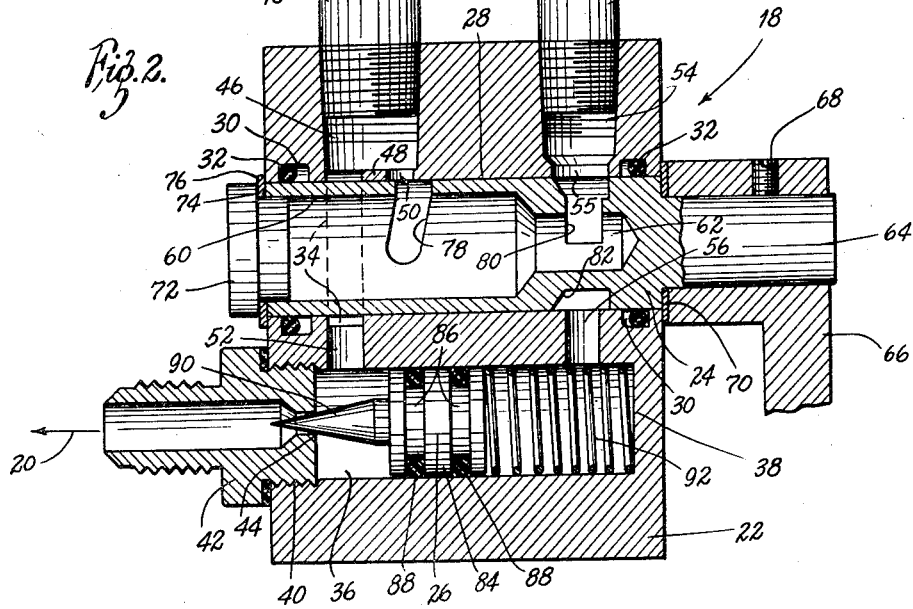
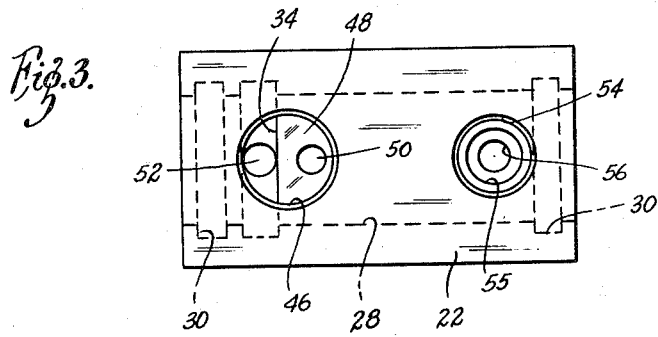
INVENTOR:
ORVILLE MITCHELL,
BY Kingsland, Rogers & Ezell
ATTORNEYS

United States Patent Office 2,789,576
Patented Apr. 23, 1957

2,789,576

HYDRAULIC VALVE FOR CONSTANT SPEED CONTROL

Orville Mitchell, Dallas, Tex., assignor to John E. Mitchell Company, Dallas, Tex., a corporation of Missouri Application August 22, 1955, Serial No. 529,863

7 Claims. (Cl. 137—116)

The present invention relates generally to hydraulic control valves, and more specifically to a novel hydraulic valve which operates automatically to maintain a constant rate of fluid flow without regard to normal relatively wide fluctuations in load resistance.

Briefly, the present invention is directed to the problem of speed control in prime movers, and particularly to the problem of overcoming the well-known tendency of prime movers to slow down and speed up, at least momentarily, under sudden pronounced fluctuations in load. In material feed equipment, for example, it is often extremely desirable that constant speed be maintained under load conditions that are inherently variable.

By and large, hydraulically powered driving means has given the most promise of meeting the conditions of the above-mentioned class of machinery, and it is an object of the present invention to provide a hydraulic driving arrangement which incorporates a novel valve for constant speed control.

Inasmuch as hydraulic flow is a direct function of pressure differential, regulation of the latter offers one method of controlling the former; hence, it is another object of the invention to provide a valve which maintains a substantially constant pressure differential between inlet and outlet without regard to variations in the magnitudes of the pressures.

The ability to adjust speed accurately over a relatively wide range being often of prime importance, it is another object of the invention to provide a novel hydraulic valve which is adjustable to vary the quantity flow therethrough infinitely over a wide range while maintaining a substantially constant pressure differential between inlet and outlet.

In order to maintain a high degree of accuracy in the regulation of a constant pressure differential between inlet and outlet, the present invention contemplates balancing the inlet pressure against the outlet pressure for mutual regulation of a hydraulic bypass, and it is an object of the invention to incorporate a hydraulically balanced bypass regulator in an adjustable control valve.

Other objects of the invention are to provide a constant flow hydraulic valve which is rugged in its design and construction which is simple and dependable in its operation, and which is otherwise well suited to its intended purpose.

The foregoing, along with additional objects and advantages, will be apparent from the following description taken in conjunction with the accompanying drawings, in which:

Figure 1 is a schematic representation of a hydraulic driving arrangement which incorporates the hydraulic control valve of the present invention;

Figure 2 is a medial cross section through a hydraulic control valve constructed in accordance with the teachings of the present invention; and Figure 3 is a top plan view of a valve body.

Referring to the drawing more particularly through the use of reference characters applied thereto, Figure 1 depicts an arrangement wherein a material feed motor, designated generally by the letter M, constitutes the power delivering element. The motor M is of the hydraulic type, receiving hydraulic fluid through an inlet line 12 and discharging it through an outlet line 14 which leads directly back to a positive displacement pump designated by the letter P. The pump P delivers its entire output through a line 16 to a hydraulic control valve 18, and the latter directs a predetermined rate of flow through the inlet line 12, while, at the same time, bypassing the surplus flow through a bypass line 20 to the line 14 and, hence, back to the pump P. As will be made clear hereinafter, the valve 18 functions to direct a constant rate of flow through the motor inlet line 12 regardless of normal, albeit relatively wide, variations in pressure required to maintain the constant rate of flow.

As best shown in Figure 2, the valve 18 comprises a body 22 in which are mounted a control valve 24 and a regulator valve 26. Considering the body 22 by itself for a moment, this member may well take a rectangular block-like form as clearly indicated in Figures 2 and 3. A cylindrical bore 28 is formed in the body 22 so as to extend completely therethrough. This bore 28 accommodates the control valve 24 as shown, and is provided adjacent each end with an annular groove 30 for accommodation of O-rings 32. An additional annular groove 34 is formed in the bore 28 slightly inwardly of one of the grooves 30 as clearly depicted in Figures 2 and 3.

A bore 36 is formed in the body 22 so as to extend parallel to the bore 28, but the bore 36 has a blind or closed end 38 remote from the annular groove 34 above mentioned. The open end of the bore 36 is provided with internal threads 40 for receiving a connector 42 provided at its inner end with a restricted valve seat 44.

At its upper end, as depicted in the drawings, the body 22 is provided with a threaded inlet 46 which is generally well-like in that it terminates at a floor 48 immediately above the bore 28. As clearly illustrated in the drawing, however, a short cylindrical passage 50 is formed in the floor 48 so as to communicate the inlet 46 with the bore 28. It will be further observed that the aforementioned annular groove 34 cuts through the floor 48 so as also to intersect the inlet 46. A passage 52 communicates the groove 34 with the regulator valve bore 36.

The body 22 is provided with a threaded outlet 54 for connection to the motor inlet line 12. The outlet 54 is formed parallel to the inlet 46 and is communicated directly to the control valve bore 28 through an aperture 55. A passage 56, coaxial with the outlet 54 and the aperture 55 communicates the bore 28 with the blind end of the bore 36.

The control valve 24 includes a main cylindrical portion which fits smoothly and slidably within the bore 28. It has a central bore 60 which extends from one end inwardly a distance sufficient to extend past the inlet 46 almost to the outlet 54 as clearly illustrated in Figure 2. A smaller bore 62 then extends coaxially beyond the bore 60 past the outlet 54. Both the bore 60 and the bore 62 are concentric with the exterior cylindrical surface of the valve 24. A solid stem 64 extends clear of the body 22 for accommodation of a crank 66 secured to the valve 24 by a setscrew 68. A washer 70 may be interposed between the crank 66 and the face of the body 22.

The open end of the valve 24 is provided with a plug 72 sealing the end of the bore 60. Preferably, the engagement of the plug 72 in the end of the valve 24 is such as to leave a space 74 for receiving a snap retaining ring 76.

A slot 78 is formed in the shell-like wall of the valve 24 so as to extend approximately half-way around the periphery thereof. This slot 78 is preferably helical with respect to the axis of the valve 24 and is so located that the end nearer the plug 72 coincides longitudinally with the axis of the aforementioned cylindrical passage 50, whereas the end farther from the plug 72 extends beyond such coincidence. In other words, the arrangement is such that when the valve 24 is rotated in the bore 28, the passage 50 is gradually closed off or opened depending upon the direction of rotation. Thus, a 180° movement of the valve 24 is effective to change the relationship from full open to full closed by infinitely variable degree.

Another slot, 80, is formed in the valve 24 for communication with the outlet 54 of the body 22. The slot 80, however, is normal to the axis of the valve 24 so as to be in full communication at all times with the outlet 54. An annular groove 82 is formed in the exterior surface of the cylindrical valve 24 so as to communicate both the outlet 54 and the groove 80 with the passage 56 and hence with the blind end of the bore 36.

The regulator valve 26 comprises a cylindrical portion 84 provided with annular grooves 86 for accommodating O-rings 88 and includes also an integral conical portion 90 which extends coaxially with the cylinder 84 for cooperation with the aforementioned valve seat 44 formed in the connector 42. A compression spring 92 interposed between the cylindrical portion 84 of the regulator valve 26 and the blind end 38 of the bore 36 serves to bias the valve 26 toward the seat 44.

*Operation*

As explained hereinbefore, the valve 18 is adapted particularly for use in an arrangement such as that illustrated in Figure 1. Assuming then that this driving arrangement has for its primary purpose the delivery of constant driving speed without regard to load changes on the hydraulic motor M, it is essential that a constant rate of flow of hydraulic fluid be maintained through the line 12. The pump P must obviously be capable of providing the required flow rate at whatever normal operating pressures may be encountered. Actually, for the purpose of the present arrangement, the pump P must have both a pressure capacity and a flow rate capacity somewhat in excess of the requirement of the motor M, as will be seen.

Directing attention more specifically to the operation of the valve 18, the positive displacement pump P delivers hydraulic fluid through the line 16 to the inlet 46 of the valve 18. From the inlet 46, fluid flows freely through the annular groove 34 and the passage 52 to the valve end of the regulator bore 36. Assuming the valve 24 to be in an appropriate operating position, fluid will also flow from the inlet 46 through the passage 50 and the cooperating groove or slot 78 to the interior 60 of the valve 24 and hence on into the smaller bore 62, and out the slot 80 into the outlet 54. From the outlet 54 of the valve 18, the fluid flows through the inlet line 12 to the motor M. It will be observed, however, that fluid from the outlet 54 is also communicated at outlet pressure, through the annular groove 82 and the passage 56 to the blind end of the regulator bore 36.

Under the foregoing conditions, the regulator valve 84 is subjected to three different forces which tend to displace it within the bore 36. One of these forces is the pressure of the fluid in the valve end of the bore 36, which tends to retract the conical portion 90 from the valve seat 44, and it will be noted that this pressure, being freely communicated back to the inlet 46 is the same as the pump delivery pressure existing at the passage 50. The second force acting on the regulator valve 84 is the pressure of the fluid in the blind end of the bore 36, tending to force the conical portion 90 into the valve seat 44. This pressure in the blind end of the bore 36, being communicated directly with the outlet 54 and with the discharge side of the cooperating passage 50 and slot 78, will be less than that existing within the inlet 46 by an amount equal to the pressure drop through the restricted valve passage 50. The third force acting on the regulator valve 26, also tending to force the conical portion 90 into the valve seat 44, is, of course, the compression spring 92.

If, under the foregoing conditions, the positive displacement pump P is assumed to have greater pumping capacity than can be handled through the restricted passage 50, the surplus must necessarily flow through the annular groove 34 and the passage 52 into the valve end of the bore 36. If it be further assumed for the moment that the pump P has relatively unlimited pressure capacity, the fluid pressure effective at the valve end of the bore 36 must necessarily prevail to retract the conical portion 90 from the seat 44 so that fluid will be bypassed through the line 20 back to the pump P. While the pressure of fluid in the blind end of the bore 36 and the force of the spring 92 cannot prevent this opening of the valve seat 44, they are effective to provide a balancing force which causes the regulator valve 26 to seek and maintain a position of equilibrium wherein fluid is bypassed at a rate which establishes a predetermined difference between the fluid pressures on different sides of the valve 26. This same difference of pressures, incidentally, exists above and below the valve passage 50 which controls the rate of fluid flow to the motor M. The magnitude of the pressure difference is clearly dependent upon the force required to compress the spring 92. It is apparent, then, that under conditions of continuous flow through the valve 18 the pressure difference between the inlet 46 and the outlet 54 will remain substantially constant regardless of whether the flow rate is relatively high or relatively low and regardless of the magnitudes of the individual pressures.

Considering for a moment the effect of a sudden increase in load on the motor M, it is apparent that the increase will be reflected as an upward surge in pressure in the inlet line 12, and hence in the outlet 54 of the valve 18. This pressure surge will be extended to the blind end of the regulator bore 36 and will tend to close the bypass valve 44. As a result of this, the positive displacement pump P immediately builds up the pressure in the valve end of the bore 36 and, of course, in the inlet 46. This increased pressure reopens the bypass valve 44 so as to reestablish the previous equilibrium condition of the regulator valve 26, but it is at the same time obvious that while the pressure in both the inlet 46 and the outlet 54 have been increased in magnitude, the difference between these pressures has been maintained substantially constant. Inasmuch as the restricted passage 50 has not changed in size, and inasmuch as the pressure difference thereacross has been maintained constant, the rate of flow through the valve 18 also is maintained constant.

It will be understood, of course, that the illustrated arrangement must necessarily have protection against the build up of excessive pressures. Inasmuch, however, as such a protective feature forms no part of the present invention, it is sufficient to assume that the pump P includes an appropriate internal relief valve for protection of the system.

As has been previously mentioned, the valve 24 is adjustable to vary the opening through the valve passage 50, but this has negligible effect upon the pressure difference thereacross. Thus, the rate of fluid flow through the valve 18 may be adjusted at will and, however adjusted, will remain constant pending subsequent movement of the valve 24.

Clearly, there has been described a hydraulic valve for constant speed control and an arrangement incorporating the same which together fulfill the objects and advantages sought therefor.

It is to be understood that the foregoing description and the accompanying drawing have been given only by way of illustration and example. It is further to be understood that changes in the form of the elements, rearrangement of parts, and substitution of equivalent elements, all of which will be apparent to those skilled in the art, are contemplated as being within the scope of the present invention, which is limited only by the claims which follow.

What is claimed is:

1. A hydraulic valve for constant speed control comprising, in combination, a main body provided with a main cylindrical bore and an auxiliary cylindrical bore, means defining an inlet and an outlet to said body, first fluid passage means communicating said inlet with one end of said auxiliary bore, second fluid passage means communicating said inlet with said main bore at one point in the latter, third fluid passage means communicating said outlet with said main bore at another point in the latter, and with the other end of said auxiliary bore, means comprising a sleeve-like member movably disposed in said main bore for selectively intercommunicating said second fluid passage means and said third fluid passage means, said member having an opening in the wall thereof positioned for variable alignment with the aforesaid second fluid passage means, and means movably disposed in said auxiliary bore for regulating fluid pressure in said inlet in accordance with fluid pressure existing in said outlet.

2. The valve of claim 1, wherein the intercommunicating sleeve-like member is disposed for rotary movement in the main bore, and wherein the opening in the member is of generally helical slot-like form.

3. A hydraulic valve for constant speed control comprising, in combination, a main body provided with a main cylindrical bore and an auxiliary cylindrical bore, means defining an inlet and an outlet to said body, first fluid passage means communicating said inlet with one end of said auxiliary bore, said first fluid passage means being defined in part by an annular groove formed in the main bore so as to intersect the inlet and in part by a passage formed in extension of the inlet so as to intercommunicate said annular groove and the auxiliary bore, second fluid passage means communicating said inlet with said main bore at one point in the latter, third fluid passage means communicating said outlet with said main bore at another point in the latter and with the other end of said auxiliary bore, means movably disposed in said main bore for selectively intercommunicating said second fluid passage means and said third fluid passage means, and means movably disposed in said auxiliary bore for regulating fluid pressure in said inlet in accordance with fluid pressure existing in said outlet.

4. The valve of claim 2, wherein the third fluid passage means is defined in part by an annular groove formed in the wall of the sleeve-like member, the plane of said groove being positioned on the extended axis of the outlet, and the sleeve-like member having a semi-annular slot formed therein for intercommunicating the interior of the sleeve-like member with the third fluid passage means.

5. The valve of claim 3, wherein the second fluid passage means is defined by an aperture formed in extension of the inlet so as to communicate the latter with the main bore.

6. The valve of claim 5, wherein the inlet is well-like and has a floor, said floor separating the inlet from the main bore, said annular groove being formed so as to extend through said floor in intersecting the inlet, and said aperture formed in extension of the inlet being formed in said floor.

7. The valve of claim 6, wherein the intercommunicating means disposed in the main bore has a cylindrical surface portion which cooperates with said annular groove to define at least a portion of the first fluid passage means, said cylindrical surface having an arcuate deformation therein which cooperates with said aperture for varying the degree of intercommunication between the inlet and the outlet.

References Cited in the file of this patent
UNITED STATES PATENTS

| | | |
|---|---|---|
| 1,467,522 | Amsler | Sept. 11, 1923 |
| 1,804,751 | Doble | May 12, 1931 |
| 2,102,865 | Vickers | Dec. 21, 1937 |
| 2,316,445 | Marshall | Apr. 13, 1943 |